US008374182B2

(12) United States Patent
Mehta et al.

(10) Patent No.: US 8,374,182 B2
(45) Date of Patent: Feb. 12, 2013

(54) VIRTUAL LOCAL AREA NETWORK (VLAN)-BASED MEMBERSHIP FOR MULTICAST VLAN REGISTRATION

(75) Inventors: Anish Mehta, Fremont, CA (US);
Soumen Biswas, San Jose, CA (US);
Sadiq Shaikh, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 259 days.

(21) Appl. No.: 12/855,860

(22) Filed: Aug. 13, 2010

(65) Prior Publication Data

US 2012/0039334 A1  Feb. 16, 2012

(51) Int. Cl.
*H04L 12/56* (2006.01)

(52) U.S. Cl. .......................... 370/390; 370/393; 370/401

(58) Field of Classification Search .................. 370/390, 370/393, 401
See application file for complete search history.

(56) References Cited

U.S. PATENT DOCUMENTS

| | | | |
|---|---|---|---|
| 7,512,124 B2 | 3/2009 | Sangroniz et al. | |
| 7,590,120 B2 | 9/2009 | Shuen et al. | |
| 2003/0165140 A1* | 9/2003 | Tang et al. | 370/393 |
| 2005/0152370 A1* | 7/2005 | Meehan et al. | 370/393 |
| 2007/0127459 A1* | 6/2007 | Lo et al. | 370/389 |
| 2008/0075078 A1 | 3/2008 | Watanabe | |
| 2010/0202452 A1* | 8/2010 | Ram et al. | 370/390 |

FOREIGN PATENT DOCUMENTS

EP  1 924 030 A1  5/2008

OTHER PUBLICATIONS

Cisco system inc., "configuring IGMP snooping and MVR", catalyst 3750 switch software confihuration guide, chapter 24, 2004-2005, 26 pages.*
Wikipedia, "Multicast VLAN Registration", http://en.wikipedia.org/wiki/Multicast_VLAN_Registration, Jul. 5, 2010, 1 page.
Cisco Systems, Inc., "Configuration IGMP Snooping and MVR", Catalyst 3750 Switch Software Configuration Guide, Chapter 24, 2004-2005, 26 pages.
European Search Report corresponding to EP 11 15 4024 mailed Nov. 11, 2011, 8 pages.

* cited by examiner

*Primary Examiner* — Dang Ton
*Assistant Examiner* — Mewale Ambaye
(74) *Attorney, Agent, or Firm* — Harrity & Harrity, LLP

(57) ABSTRACT

A network node that includes a memory to store a multicast forwarding table that contains entries that govern how multicast traffic is to be forwarded from a multicast virtual local area network (MVLAN) associated with the network node, to receiver VLANs associated with the network node, where each entry includes a multicast group, that is associated with a group of ports on the multicast VLAN via which the multicast traffic is received, and information associated with the receiver VLANs to which the received multicast traffic is to be sent. The network node also includes a processor to receive multicast traffic associated with a particular multicast group, via a particular port on the multicast VLAN; perform, using the multicast forwarding table, a look up operation, based on the particular multicast group, to determine to which of the receiver VLANs the multicast traffic is to be sent; and transmit the multicast traffic, associated with the particular multicast group, to user devices, via the receiver VLANs, based on a determination that the entry, associated with the particular multicast group, includes information associated with the receiver VLANs.

25 Claims, 9 Drawing Sheets

| VLAN Name | VLAN Type | Source | Ports | Mode |
|---|---|---|---|---|
| 405-1 | Source | 255.10.0.0 to 255.10.0.Y | 0 to (H-1) | mode 1 |
| 405-2 | Source | 255.10.1.0 to 255.10.0.1.2 | H to (K-1) | mode 1 |
| 410-1 | Receiver | 405-1 405-2 | K to (J-1) | |
| 410-2 | Receiver | 405-1 | J to (L-1) | |
| 410-3 | Receiver | 405-2 | L to (N-1) | |

VIRTUAL LOCAL AREA NETWORK (VLAN)-BASED MEMBERSHIP FOR MULTICAST VLAN REGISTRATION

BACKGROUND

Virtual Local Area Networks (VLANs) are employed in today's network to provide flexibility for segregated network services, such as security, network management, traffic flow, etc., regardless of physical locations of user devices or to which network node the user devices are connected. VLANs are often used to provide multicast services in which a particular VLAN is configured to receive a multicast data stream via a particular multicast group address and to send, via ports associated with the VLAN, a copy of the multicast stream to subscribing hosts (e.g., a computer, a set top box, etc.) associated with the VLAN. The VLAN is usually not permitted to send the multicast stream to ports that are not associated with the VLAN. Unfortunately, if multiple VLANs desire the multicast stream, then multiple copies of the multi-cast stream must be transmitted via the network, which consumes bandwidth and/or other network resources.

SUMMARY

According to one aspect, a network node may include a group of ports via which multicast traffic is received or transmitted. The network node may also include a memory to store information associated with a multicast forwarding table that may include identifiers for one or more ports, of the group of ports, associated with a multicast virtual local area network (MVLAN) via which the multicast traffic is received by the network node from a network path, and identifiers for a group of receiver VLANs (RVLANs) associated with two or more other ports, of the group of ports, via which the multicast traffic is to be received from the MVLAN, where an identifier for at least one group of RVLANs corresponds to an identifier for at least one of the one or more ports. The network node may further include a processor to receive the multicast traffic via a particular port of the one or more ports; perform, using the multicast forwarding table, a look up operation, based on a identifier for the particular port, to determine whether to send the multicast traffic via a first RVLAN of the group of RVLANs, via a second RVLAN of the group RVLANs, or via the first RVLAN and the second RVLAN; transmit the multicast traffic, to a host device and via the first RVLAN, when the look up operation indicates that a first identifier, associated with the first RVLAN, corresponds to the identifier for the particular port; transmit the multicast traffic, to another host device and via the second RVLAN, when the look up operation indicates that a second identifier, associated with the second RVLAN, corresponds to the identifier for the particular port; and transmit the multicast traffic, to the host device via the first RVLAN and to the other host device via the second RVLAN, when the look up operation indicates that the first identifier and the second identifier correspond to the identifier for the particular port.

According to another aspect, a method may be performed by a network node. The method may include receiving information associated with a multicast virtual local area network (MVLAN) and information associated with a receiver virtual local area network (RVLAN), the network node may include a group of ports, where the information associated with the MVLAN, when deployed to the network node, may establish the MVLAN that includes one or more ports, of the group of ports, via which multicast traffic may be received from another network node, the one or more ports corresponding to a range of multicast group addresses, and the information associated with the RVLAN, when deployed on the network node, may establish the RVLAN that may include one or more other ports, of the group of ports, that are connected to a group of host devices and that logically establishes the MVLAN as a source from which the RVLAN is to receive the multicast traffic. The method may also include deploying, on the network node, the MVLAN and the RVLAN based on the information associated with MVLAN and the information associated with the RVLAN; detecting, via a particular port of the one or more other ports, a request, to join a multicast group, from a host device of the group of host devices; creating, based on the request, a forwarding entry in a multicast forwarding table associated with the network node, where the forwarding entry may include an identifier for the particular port to which particular multicast traffic, associated with the multicast group, is to be sent and an identifier for one of the one or more ports associated with the multicast group; receiving, via the one of the one or more ports, the particular multicast traffic; and transmitting, to the host device and via the particular port, the particular multicast traffic based on the forwarding entry.

According to yet another aspect a network node may include a memory to store a multicast forwarding table that contains a group of forwarding entries that govern how multicast traffic is to be forwarded from a multicast virtual local area network (VLAN) associated with the network node, to a group of receiver VLANs associated with the network node, where each forwarding entry may include a multicast group, of a group of multicast groups, that is associated with a group of ports on the multicast VLAN via which the multicast traffic is received, and information associated with a set of receiver VLANs, of a group of receiver VLANS, to which the received multicast traffic is to be sent. The network node may also include a processor to receive multicast traffic associated with a particular multicast group of the group of multicast groups, via a particular port, of the group of ports, on the multicast VLAN; perform, using the multicast forwarding table, a look up operation, based on the particular multicast group, to determine to which of the group of receiver VLANs the multicast traffic is to be sent; and transmit the multicast traffic, associated with the particular multicast group, to a group of user devices, via the set of VLANs, based on a determination that the forwarding entry, of the group of forwarding entries associated with the particular multicast group, includes information associated with the set of receiver VLANs.

BRIEF DESCRIPTION OF THE DRAWINGS

FIG. 5 is an example VLAN set up configuration memory;

DETAILED DESCRIPTION

Figure 1:
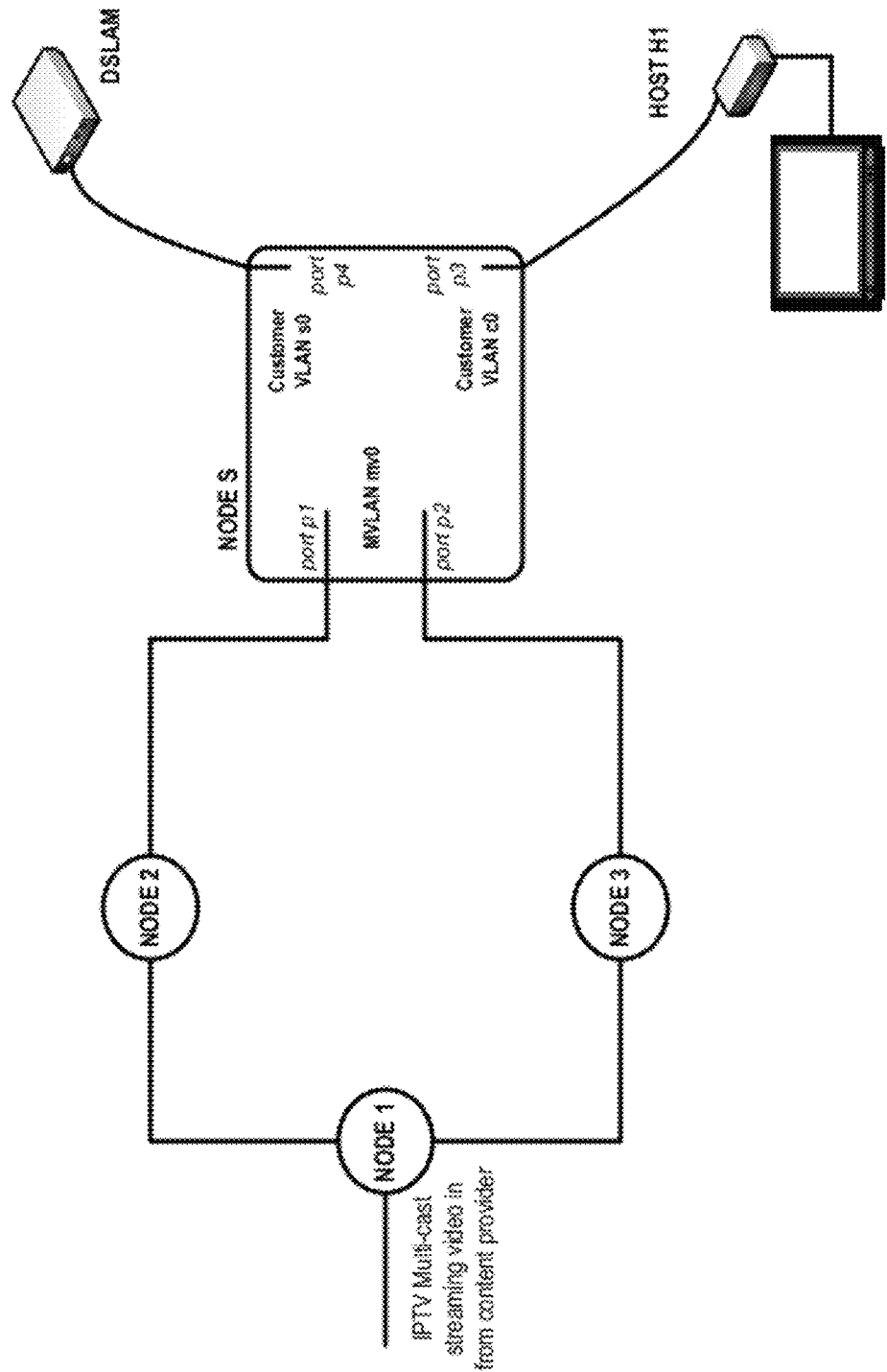
FIG. 1 is a diagram of an overview of a virtual local area network (VLAN)-based membership for a multicast VLAN registration implementation described herein.

The following detailed description refers to the accompanying drawings. The same reference numbers in different drawings may identify the same or similar elements. Also, the following detailed description does not limit the invention.

An implementation described herein may include systems and/or methods that provide for a virtual local area network (VLAN)-based membership for a multicast VLAN registration (MVR) implementation. The systems and/or methods may employ a technique that enables a multicast VLAN (hereinafter referred to "MVLAN"), or a set of MVLANs, to send multicast traffic streams to hosts (e.g., user devices, server devices, network nodes), associated with other VLANs, that are not a part of or connected to the MVLAN.

The term "VLAN," as used herein, may include attributes that are the same or similar to a physical local area network (LAN) that enables user devices and/or other devices to be grouped together to interact and/or receive a common set of services (e.g., security, network management, communications, traffic flow management, etc.) regardless of physical locations and/or to which network node the user devices are connected. However, unlike a physical LAN, a VLAN may not be directly tied to specific hardware and/or may share bandwidth, transport, and/or processing capacity/resources associated with the underlying network.

As described herein, a MVLAN (e.g., sometimes referred to as a "MVR source VLAN") may perform multicast operations by receiving multicast traffic from a network and selectively forwarding multicast traffic to other VLANs that are associated with the MVLAN. For example, a MVLAN may include a collection of ports on a network node, that correspond to a range of multicast group addresses (e.g., an address to which multicast traffic is addressed), that receive multicast traffic. Additionally, or alternatively, the MVLAN may selectively forward the multicast traffic to ports associated with other VLANs (e.g., sometimes referred to as "MVR receiver ports"). The term "MVR receiver VLAN," as used herein, may refer to a VLAN that includes a collection of MVR receiver ports (e.g., that are different from the ports associated with the MVLAN) via which multicast traffic, received from a MVLAN, may be sent to hosts associated with the MVR receiver VLAN (sometimes referred to as a receiver VLAN (RVLAN).

In one example implementation, an MVLAN and/or MVR receiver VLAN may be set up on a network node. For example, a MVR application may permit a network administrator to set up a MVLAN or a set of MVLANs and/or a MVR receiver VLAN and/or a set of MVR receiver VLANs on a network node that may perform VLAN-based multicast operations. The MVR application may, for example, receive parameters, from the network administrator, to establish the MVLAN on the network node, such as a range of group addresses, port assignments, mode (e.g., transparent mode, proxy mode, etc.), and/or other information. The MVR application may also receive parameters to establish the MVR receiver VLAN, such as MVR receiver port assignments, designations of MVLANs from which multicast traffic is to be received, etc. The MVR receiver port assignments may correspond to ports associated with another VLAN (e.g. such as a customer VLAN from which host devices received multicast and non-multicast traffic). In one example, the port assignments associated with the MVLAN may not coincide with, overlap, and/or be the same as the MVR receiver port assignments associated with the MVR receiver VLAN (e.g. and/or a customer VLAN). The MVR application may use the parameters to install, set up, and/or deploy the MVLAN and/or MVR receiver VLAN on the network node.

In another example implementation, the MVR application may establish and/or update multicast forwarding entries associated with a MVLAN. For example, the MVR application may use a technique, based on a particular protocol (e.g., Internet Group Management Protocol (IGMP)) to monitor (e.g., sometimes referred to as "listening" and/or "snooping") multicast traffic on a port associated with a MVR receiver MVLAN. The MVR application may monitor the port to identify a request, from a host associated with the port, for group membership associated with particular multicast traffic (e.g., sometimes referred to as a "join" and/or an "add") to enable the host to receive the particular multicast traffic from the MVR receiver MVLAN. Based on the request for group membership, the MVR application may, for example, cause the group membership to be set up on a MVLAN that includes a multicast group address that receives the particular multicast traffic.

In yet another example implementation, the MVR application may perform multicast operations on received multicast traffic. For example, multicast traffic may be received, via a particular port, by a MVLAN and the MVR application may determine to which VLAN the multicast traffic is to be sent. More particularly, the MVR application may use multicast forwarding tables to perform a lookup operation determine to which MVR receiver ports (e.g., associated with a VLAN) the multicast traffic is to be sent.

Sending a single copy of a multicast traffic stream to a MVLAN, may enable the multicast traffic stream to be sent, via a VLAN or collection of VLANs (e.g., MVR receiver VLANs), to an array of hosts not connected to the MVLAN. Additionally, or alternatively, the MVLAN may enable multicast traffic (e.g., Internet protocol television (IPTV) channels) to be sent to host devices from multiple VLANs (MVR receiver VLANs) rather than a single VLAN. Enabling only the single copy of the multicast data stream to be transmitted via the network, may reduce the bandwidth, network resources, and/or packet errors associated with transmitting, receiving and/or processing multiple copies of the multicast traffic stream.

FIG. 1 is a diagram of an overview of a VLAN-based membership for a multicast VLAN registration implementation described herein. As shown in FIG. 1, a network carrying multicast traffic (e.g., Internet protocol television (IPTV) traffic, such as IPTV channels that include multicast streaming video traffic) and/or other traffic may include a set of nodes (e.g., node 1, . . . , node S). All or a portion of the packets associated with the IPTV traffic may include information (e.g., a packet header, trailer, label, etc.) that contains a multicast group address that corresponds to a particular port on an MVLAN (e.g., mv0) hosted by node S.

As shown in FIG. 1, node S may, for example, include a MVLAN (e.g., shown as mv0), customer VLANs (e.g., shown as c0 and s0), and/or other MVLANs and/or customer VLANs not shown in FIG. 1. In this example, the MVLAN may have been configured, via a MVLAN set up operation (e.g., at a prior point in time), to include a set of ports (ports p1, p2, and/or other ports not shown in FIG. 1) that correspond to a range of multicast group addresses. The ports may, for example, may receive multicast network traffic via nodes 1-3 destined for the MVLAN.

Customer VLAN c0 may have been configured (e.g., during the MVLAN set up operation) to include a set MVR receiver ports (e.g., port p3 and/or other ports not shown in FIG. 1) that permit a host (e.g., shown has host H1) or a set of hosts, to receive multicast traffic. Host H1 may, in this example, be a user device, such as a set top box, a computer device, etc. Additionally, or alternatively, customer VLAN c0 may, for example, have been configured as a MVR receiver VLAN that was set up to receive multicast traffic from the MVLAN (e.g., mv0) and/or the other MVLANs.

Customer VLAN s0 may have been configured, at a prior point in time, to include a set of ports (e.g., port p4 and/or other ports not shown in FIG. 1) that permit a host, such as a digital subscriber line access multiplexer (e.g., shown as a DSLAM that permits a collection of user devices to be connected to port p4 via the DSLAM), to receive multicast traffic. Additionally, or alternatively, customer VLAN s0 may have been configured (e.g., during a MVLAN set up operation) as another MVR receiver VLAN that permits hosts (e.g., DSLAM) to receive multicast traffic via ports (e.g., port p4) that are enabled to receive multicast traffic from MVLAN (e.g., mv0) and/or other MVLANs.

As also shown in FIG. 1, the source MVLAN may receive multicast traffic (e.g., the IPTV multicast traffic). For example, the MVLAN (e.g., mv0) may receive packets (e.g., via nodes 2 and/or 3), associated with the multicast traffic (e.g., at ports p1 and/or p2), that include a membership group address that corresponds to a port associated with the MVLAN (e.g., port p1 and/or p2). The MVR application may, for example, process the packets by performing an operation, using a bridging table associated with the MVLAN, to identify which customer VLAN(s) (e.g., MVR receiver VLANs) are to receive multicast traffic from MVLAN (e.g., mv0).

In another example, the MVR application may monitor MVR receiver ports for group membership requests and may make multicast forwarding entries in a MVLAN forwarding table based on the requests. For example, the MVR application may monitor (e.g., using an IGMP snooping technique) MVR receiver ports (e.g., ports 3 and/or port 4), associated with customer VLANs (e.g., c0 and/or s0, respectively) to identify group membership requests from hosts associated with the customer VLANs. Group membership requests may include requests to join/subscribe to a group membership that is to receive particular multicast traffic, requests to leave/unsubscribe to the group membership, and/or other requests. In one example, the MVR application may identify (e.g., on port 3) a request to subscribe to a group membership (e.g., a join), associated with particular multicast content, that includes a group membership address. The MVR application may, for example, determine that a particular port on the MVLAN (e.g., port p1 associated with the group membership address) receives the particular multicast traffic.

Based on the determination, the MVR application may add the customer VLAN (e.g., c0 and/or receiver port p3)) to the group membership as a multicast forwarding entry (e.g., a bridge entry) in the bridging tables associated with the MVLAN. In another example, the MVR application may identify (e.g., on port p4 associated with customer VLAN s0) a request to unsubscribe to a group membership (e.g., a leave), associated with other multicast content, that includes another group membership address. In a manner similar to that described above, the MVR application may make a forwarding entry that removes the VLAN (e.g., s0) from the bridging tables associated with a port on MVLAN that receives the other multicast traffic. In yet another example, multicast traffic may be received by a MVLAN (e.g., via ports p1 or p2) and the MVR application may forward the multicast traffic to MVR receiver ports, associated with customer VLAN c0, but not customer VLAN s0 based on the updated multicast forwarding table.

In another example, the MVLAN may be configured (e.g., during the set up process) in a transparent mode, proxy mode, or some other mode. For example, the transparent mode permits all membership group requests, detected at MVR receiver ports (e.g., p3 and/or p4) via IGMP snooping, to be accessed via the MVLAN. In this example, the MVLAN is deemed to be transparent to the group membership requests, which may, for example, permit a content provider, associated with multicast traffic, to access viewing habits (e.g., IPTV channels, etc.) of a user associated with a host device. In another example, the proxy mode may permit only those membership requests associated with group membership associated with the MVLAN to be accessed via the MVLAN. In this example, the content provider is permitted to access only MVLAN-related group membership requests in which the network node is deemed to act as a proxy between the host and the content provider.

Exemplary System Overview

Figure 2:
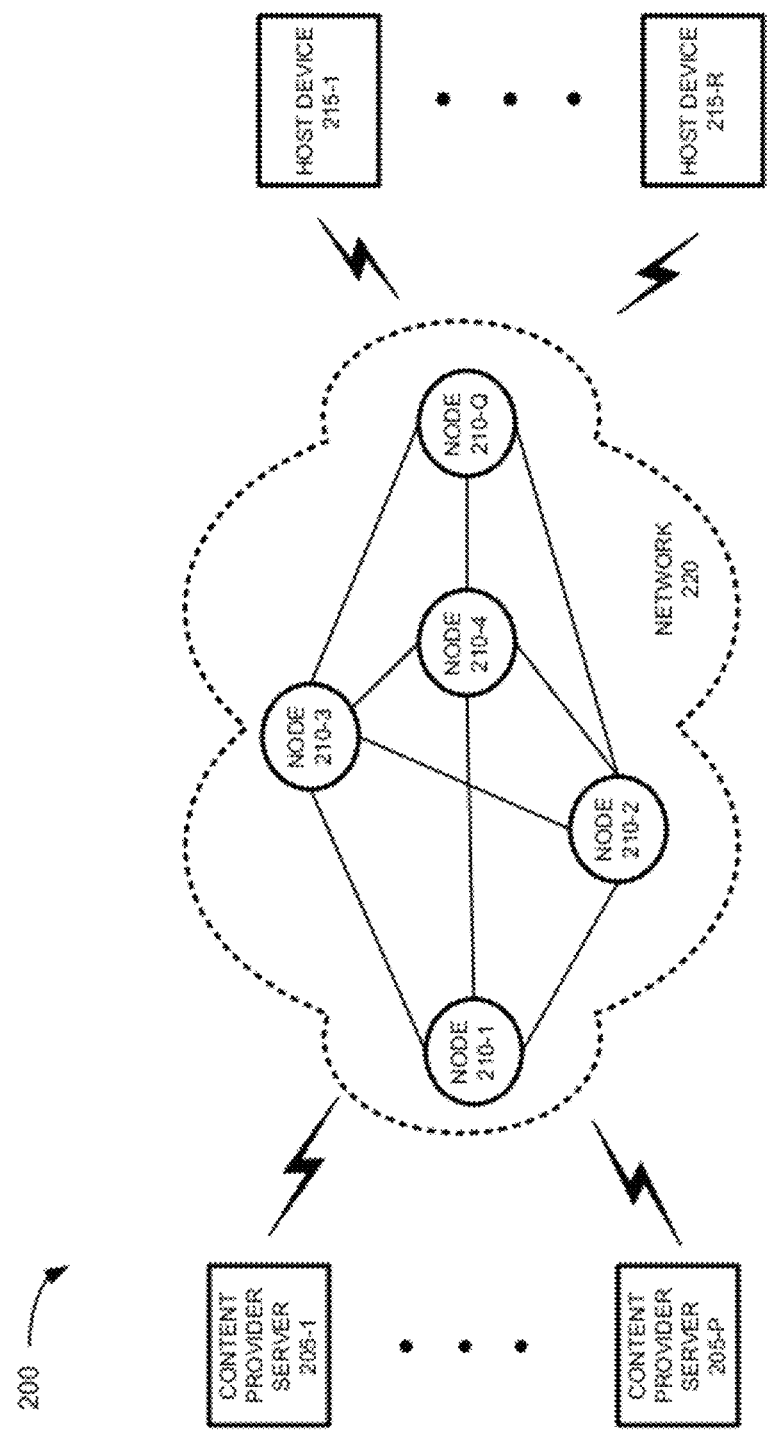
FIG. 2 is a diagram of an example network in which systems and/or methods described herein may be implemented.

FIG. 2 is a diagram of an example network 200 in which systems and/or methods described herein may be implemented. As shown in FIG. 2, network 200 may include a group of content provider servers 205-1, . . . , 205-P (where P≧1), a group of nodes 210-1, . . . , node 210-Q (where Q≧1) (hereinafter referred to collectively as "nodes 210" and individually as "node 210"), a group of host devices 215-1, . . . , 215-R (where R≧1) (hereinafter referred to collectively as "host devices 215" and individually as "host device 215) and a network 220. The number of devices, illustrated in FIG. 2, is provided for explanatory purposes only. In practice, there may be additional devices and/or networks, fewer devices and/or networks, different devices and/or networks, or differently arranged devices and/or networks than illustrated in FIG. 2. Also, in some implementations, one or more of the devices and/or networks of network 200 may perform one or more functions described as being performed by another one or more of the devices and/or networks of network 200. Devices of network 200 may interconnect via wired connections, wireless connections, or a combination of wired and wireless connections.

Content provider server 205 may include one or more server devices, or other types of computation or communication devices, that gather, process, search, store, and/or provide information in a manner similar to that described herein. For example, content provider server 205 may transmit a media stream that may be used in a multicast transmission (e.g., multicast traffic). The term "media stream," as used herein, may refer to stream of content that includes video content, audio content, text content, combinations of audio, video, and/or text content, and/or other content. For example, content provider server 205 may transmit streaming media associated with free television broadcast providers (e.g., local broadcast providers, such as NBC, CBS, ABC, and/or Fox), for-pay television broadcast providers (e.g., TNT, ESPN, HBO, Cinemax, CNN, etc.), and/or Internet-based content providers (e.g., IPTV, streaming content from web sites, etc.).

Node 210 may include a network device that transmits data traffic. For example, node 210 may take the form of a routing device, a switching device, a multiplexing device, or a device that performs a combination of routing, switching, and/or multiplexing functions. In one implementation, node 210 may be a digital device. In another implementation, node 210 may be an optical device. In yet another implementation, node 210 may be a combination of a digital device and an optical device.

Node 210 may include an internal or external storage device and/or memory that stores information associated with node 210 operations. In one example, node 210 may store, in the storage device and/or memory, network topology information, routing tables, packet forwarding tables, and multicast forwarding tables. In another example, node 210 may store, in the storage device and/or memory, information associated with VLAN and/or MVLAN configurations (e.g., names, port assignments, etc.). In yet another example, node 210 may store, in the storage device and/or memory, information associated with a user interface via which information associated with setting up a VLAN and/or MVLAN may be stored.

Edge devices, such as node 210-1, node 210-2, node 210-3, and node 210-Q, may generally function to connect hosts, such as host devices 215 and/or server devices (e.g., content provider server 205), to network 220. Core devices, such as node 210-4 may function to transmit data traffic, such as multicast traffic, between other nodes within network 220.

In one implementation, edge devices, such as node 210-1, node 210-2, node 210-3, and node 210-Q, may add (push) and/or remove (pop) information (e.g., headers, trailers, tags, etc.) from incoming and/or outgoing packets. In another implementation, nodes 210 may perform multicast operations. For example, a node (e.g., node 210-Q) may host a VLAN, or set of VLANs, that may be used receive, process and/or transmit multicast traffic to host devices 215 and/or other VLANs hosted by node 210-Q or hosted by other nodes 210. In one example, a MVR application may enable a MVLAN to be set up on node 210-Q that may receive multicast traffic from content provider server 205, via a network path that includes another node 210. In another example, the MVR application may permit customer VLANs to be set up as MVR receiver VLANs (e.g., that include MVR receiver ports via which host devices 215 receive multicast traffic and/or other traffic) to subscribe to a MVLAN and/or a set of MVLANs to receive multicast traffic via the MVR receiver ports. In yet another example, the MVR application may perform monitoring operations (e.g., using IGMP snooping techniques) on ports (e.g., MVR receiver ports) associated with a MVR receiver VLAN hosted by node 210 to detect IGMP traffic (e.g., group membership requests, such as joins, leaves, etc.) associated with multicast group membership. The MVR application may update packet forwarding tables (e.g., bridging tables associated with the MVLAN) based on the IGMP traffic.

Host device 215 may include any computation or communication device, such as a wireless mobile communication device that is capable of communicating via network 220. For example, host device 215 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a landline telephone, a set top box (STB), a television, a camera, a personal gaming system, or another type of computation or communication device. In another implementation, host device 215 may be a server device that may gather, process, search, store, and/or provide information in a manner similar to that described herein. In yet another implementation, host device 215 may include a DSLAM device that receives traffic (e.g., multicast traffic) from a VLAN port associated with node 210 and sends the traffic to other host devices 210 (e.g., user devices, such as an STB, a computer device, etc.).

Host device 215 may be associated with unique identification information, such as a device identifier (e.g., a STB identifier, a DSLAM identifier, an IP address, a MAC address, an international mobile subscriber identity (IMSI), a national access identifier (NAI), etc.), a public identifier (e.g., a mobile device number (MDN), a landline device number (LDN), a mobile subscriber integrated services digital network (MSISDN), etc.). That may permit node 210 to distinguish between host devices 215. Additionally, or alternatively, host device 215 may, for example, receive multicast traffic from a port associated with a MVR receiver VLAN hosted by node 210. In another example, host device 215 may send IGMP traffic to the MVR receiver VLAN, via the port, that includes multicast membership group requests to receive particular multicast traffic (e.g., a join) or to stop receiving the particular multicast traffic (e.g., a leave).

Network 220 may include one or more wired and/or wireless networks. For example, network 220 may include a cellular network, the Public Land Mobile Network (PLMN), and/or a second generation (2G) network, a third generation (3G) network, a fourth generation (4G) network, a fifth generation (5G) network, and/or another network. Additionally, or alternatively, network 220 may include a wide area network (WAN), a metropolitan area network (MAN), a telephone network (e.g., the Public Switched Telephone Network (PSTN)), an ad hoc network, an intranet, the Internet, a fiber optic-based network (e.g., a fiber optic service (FiOS) network), and/or a combination of networks.

Exemplary Node Architecture

Figure 3:
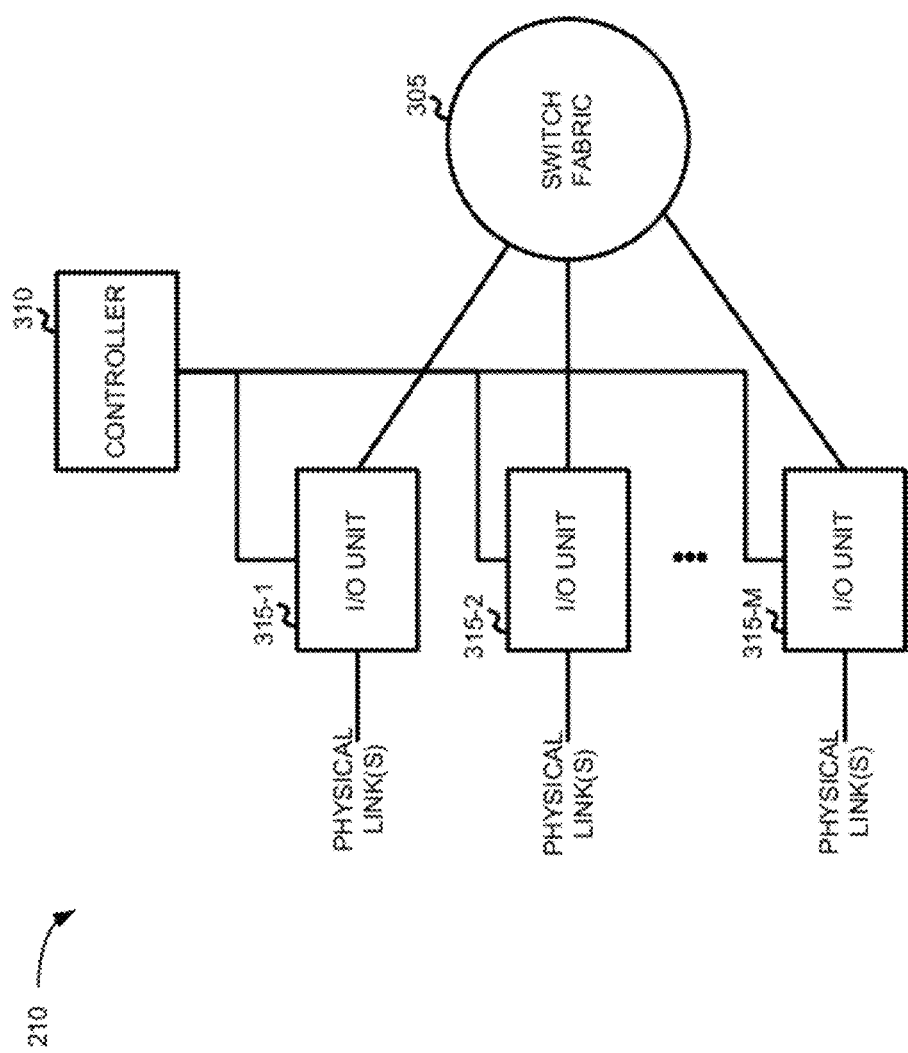
FIG. 3 is a diagram of example components of one or more of the devices of FIG. 2.

FIG. 3 is a diagram of exemplary components of node 210. As shown in FIG. 3, node 210 may include a switch fabric 305, a controller 310, and input/output (I/O) units 315-1, 315-2, ..., 315-M (collectively referred to as "I/O units 315," and individually as "I/O unit 315") (where $M \geq 1$). In another implementation, node 210 may include fewer, additional, different, or differently arranged components than those illustrated in FIG. 3. Additionally, or alternatively, one or more operations described as being performed by a particular component of node 210 may be performed by one or more other components, in addition to or instead of the particular component.

Switch fabric 305 may include one or more switching planes to facilitate communication among I/O units 315 and/or controller 310. In one implementation, each of the switching planes may include a single or multi-stage switch of crossbar elements. In another implementation, each of the switching planes may include some other form of switching elements. Switch fabric 305 may also, or alternatively, include processors, memories, and/or paths that permit communication among controller 310 and/or I/O units 315.

Controller 310 may include a processor, a microprocessor, or some form of hardware logic (e.g., an application specific integrated circuit (ASIC) or a field programmable gate array (FPGA)). Controller 310 may perform high level management functions for node 210. For example, controller 310 may communicate with other networks and systems connected to node 210 to exchange information regarding network topology. Controller 310 may create a routing table based on the network topology information, create forwarding table(s) based on the routing table, and may forward the forwarding table(s) to I/O units 315. I/O units 315 may use the routing tables to perform route lookup operations for incoming data.

Controller 310 may also perform other general control and monitoring functions for node 210. For example, controller 310 may instruct one or more I/O units 315 to remove labels, tags, headers, and/or trailers from received multicast packets, to process received multicast packets, and/or to append labels, tags, headers, and/or trailers to multicast packets to be sent. Controller 310 may host a MVR application that may enable a MVLAN to be set up on node 210. For example, the MVR application may permit one or more MVLANs to be set up on node 210 that include a port or group of ports (e.g., associated with I/O units 315), which correspond to a range of multicast group addresses that receive particular multicast traffic. Additionally, or alternatively, the MVR application may permit one or more VLANs (e.g., a customer VLAN), hosted on node 210 and/or other nodes 210, to be configured as a MVR receiver VLAN to receive multicast traffic from the MVLAN via MVR receiver ports (e.g., associated with I/O unit 315).

In another example, the MVR application may monitor ports (e.g., MVR receiver ports) associated with a customer VLAN for IGMP traffic that includes group membership requests (e.g., joins or leaves). The MVR application may use information associated with the group membership requests to create and/or update multicast forwarding tables (e.g., multicast bridge tables) and may forward the multicast forwarding tables to I/O units 315. Additionally, or alternatively, the MVR application may cause group membership requests to be sent to other ports associated with node 210 (e.g., and/or I/O units 315). For example, if a MVLAN is configured in a transparent mode, the MVR application may instruct I/O unit 315 (e.g., associated with an MVR receiver port via which a particular group membership requests was detected) to send (e.g., flood) the group membership request to other ports associated with other I/O units 315 associated with node 210. In another example, if a MVLAN is configured in a proxy mode, the MVR application may instruct I/O unit 315 (e.g., associated with an MVR receiver port via which a particular group membership requests was detected) to send the group membership request to only those ports and/or I/O units 315 associated with an MVLAN that includes the group membership (e.g., based on the multicast forwarding tables) associated with the group membership request.

I/O unit 315 may include a component or collection of components to receive packets, to process incoming and/or outgoing packets, and/or to transmit outgoing packets. For example, I/O unit 315 may include I/O ports (hereinafter referred to as ports), a packet forwarding engine (PFE), an Ethernet interface and/or another type of interface, a central processing unit (CPU), and/or a memory device. I/O unit 315 may include a collection of ports that connect, via physical links, to nodes 210 in network 220. The PFE may include packet processing component(s), switch interface component(s), Internet processor component(s), memory device(s), etc.

I/O unit 315 may perform certain operations on incoming and/or outgoing packets, such as decapsulation, encapsulation, demultiplexing, multiplexing, queuing, dequeuing, etc. operations, which may facilitate the processing and/or transportation of incoming and/or outgoing packets. I/O unit 315 may receive incoming packets and may forward the incoming packets to other I/O units 315 via switch fabric 305. For example, I/O unit 315 may receive incoming packets and may determine to which other I/O units 315 the incoming packets may be sent based on a forwarding table (e.g., received from controller 310). In another example, I/O unit 315 may receive incoming packets and may determine, based on forwarding table, that the incoming packets are to be sent via I/O unit 315.

I/O unit 315 may, for example, receive incoming packets associated with multicast traffic and may use a multicast forwarding table to determine to which other I/O units 315 (e.g., and/or the ports associated with the other I/O units 315) the multicast traffic is to be sent. In this example, I/O unit 315 may send a copy of the received multicast traffic to I/O units 315 identified in the multicast forwarding table. In another example, I/O unit 315 may receive IGMP traffic from hosts via a port on I/O unit 315, may identify the IGMP traffic (e.g., using IGMP snooping techniques), may send the IGMP traffic to other I/O units 315 (e.g., as described above) and/or may temporarily store the IGMP traffic in a memory (e.g., a queue) to be used by the MVR application.

Exemplary VLAN Port Configuration

Figure 4:
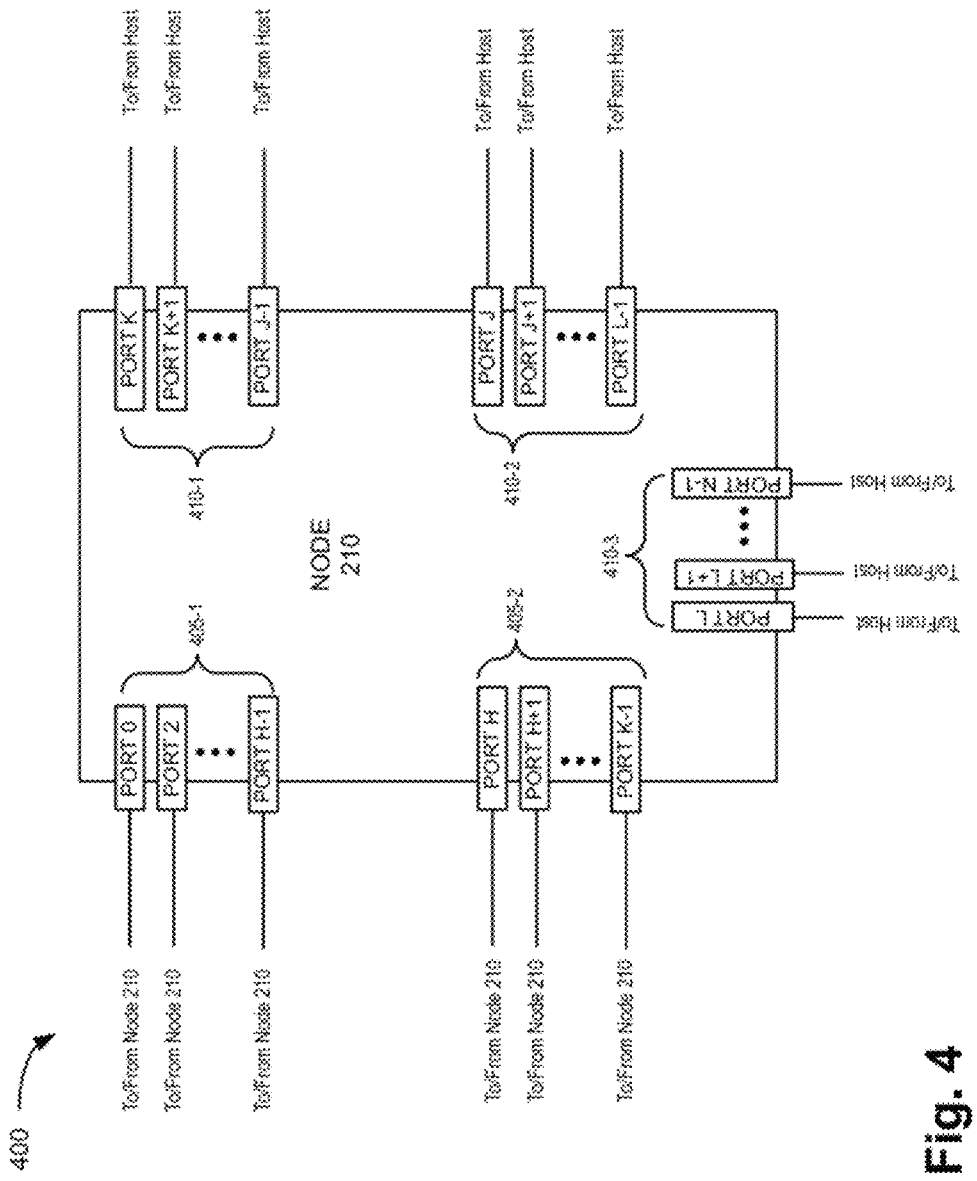
FIG. 4 is a diagram of example VLAN port assignments associated with one or more devices of FIG. 2.

FIG. 4 is a diagram of example VLAN port assignments 400 (hereinafter referred to as "VLAN ports 400") associated with node 210 of FIG. 2. For example, as illustrated in FIG. 4, VLAN ports 400 may include a collection of functional components, such as a set of MVLANs 405-1 and 405-2 (hereinafter referred to collectively as "MVLANs 405" and individually as "MVLAN 405"), and a set of customer VLANs 410-1-410-3 (hereinafter referred to collectively as "customer VLANs 410" and individually as "customer VLAN 410") associated with node 210. The number of functional components, illustrated in FIG. 4, is provided for explanatory purposes only. In practice, node 210 may be associated with fewer functional components, additional functional components, different functional components, or differently arranged functional components than are described with respect to FIG. 4. Moreover, one or more functional components in FIG. 4 may perform one or more functions described as being performed by another one or more of the functional components of FIG. 4. Also, the functional components in FIG. 4 may be implemented using one or more of the components in FIG. 3.

MVLAN 405-1 may include ports 0 through H-1. For example, the MVR application may, during a MVLAN set up operation, permit a network administrator to configure MVLAN 405-1 to accept multicast traffic associated with a range of multicast group addresses. The MVR application may, for example, identify a port, or a set of ports (e.g., port 0 through port H-1 associated with one or more I/O units 315) to receive multicast traffic associated with each address in the range of multicast group addresses and may selectively send the multicast traffic to one or more ports associated with customer VLAN 410. MVLAN 405-2 may include ports H through K-1. For example, the MVR application may configure MVLAN 405-2 to accept multicast traffic associated with a different range of multicast group addresses and may identify ports (e.g., port H through port K-1) that are different than ports associated with MVLAN 405-1.

Customer VLAN 410-1 may include ports K through J-1. For example, the MVR application may, during a MVLAN set up operation, permit a network administrator to configure a customer VLAN 410-1 to be a MVR receiver VLAN that accept multicast traffic from MVLAN 405-1 and/or MVLAN 405-2. Additionally, customer VLAN 410-1 may be configure port K through port J-1 to be MVR receiver ports K through J-1, which receive multicast traffic from MVLANs 405 and transmit the received multicast traffic to hosts (e.g., host devices 215) that are otherwise not connected to the MVLAN 405. Customer VLANs 410-2 and 410-3 may include ports J through L-1 and ports L through N-1, respectively. For example, the MVR application may configure customer VLANs 410-2 and 410-3 to be a MVR receiver VLAN that accepts multicast traffic from MVLAN 405-1, MVLAN 405-2, and/or MVLAN 405-1 and MVLAN 405-2. In one example, the MVR application may configure port K through port J-1 to be MVR receiver ports that receive multicast traffic from MVLAN 405-1 and transmit the received multicast traffic to hosts (e.g., host devices 215) that are otherwise not connected to the MVLAN 405. In another example, the MVR application may configure port L through port N-1 to be MVR receiver ports that receive multicast traffic from MVLAN 405-2 and transmit the received multicast traffic to hosts (e.g., host devices 215) that are otherwise not connected to the MVLAN 405. The MVR application may store information, associated with the configuration of MVLANs 405 and/or customer VLANs 410, in a VLAN set up configuration memory (e.g., VLAN set up configuration memory 500 of FIG. 5.

In one example, a VLAN may not be configured as both a MVLAN and a MVR receiver VLAN. Additionally, or alternatively, more than one MVLAN may not share ports from which to receive multicast traffic.

FIG. 5 is an example VLAN set up configuration memory 500. As illustrated in FIG. 5, VLAN set up configuration memory 500 (hereinafter referred to as "configuration memory 500") may include a VLAN name field 505, a VLAN type field 510, a source field 515, a ports field 520, and a mode field 522. Configuration memory 500, of FIG. 5, includes fields 505-522 for explanatory purposes. In practice, configuration memory 500, of FIG. 5, may include additional fields, fewer fields, different fields, and/or differently arranged fields than are described with respect to configuration memory 500, of FIG. 5.

VLAN name field 505 may store a name and/or identifier for a particular VLAN, such as a MVLAN, a customer VLAN, and/or some other VLAN. VLAN type field 510 may store an indicator of the type of VLAN, such as whether the VLAN is a MVLAN (e.g., a MVR "source" VLAN) or a customer VLAN (e.g., a MVR "receiver" VLAN). Source field 515 may store information associated with a source from which multicast traffic is received by the particular VLAN. For example, source field 515 may store a range of multicast group addresses associated with the particular VLAN if the particular VLAN is a MVLAN. In another example, source field 515 may store a list of MVLAN names and/or identifiers from which multicast traffic may be received. Ports field 520 may store a port identifier associated with a MVLAN and/or a MVR receiver VLAN.

Mode field 522 may store an identifier that indicates whether the MVLAN is to operate in a transparent mode (e.g., mode 1), a proxy mode (e.g., mode 2), and/or some other mode. For example, in the transparent mode the MVR application may handle IGMP traffic (e.g., multicast membership group requests and/or queries) in a manner that a request (e.g., a join and/or a leave), originating from host device 215 (e.g., such as the viewing habits of a user of host device 215), is accessible by and/or via a MVLAN regardless of whether the request pertains to multicast group membership associated with the MVLAN. In the proxy mode, for example, the MVR application may handle IGMP traffic in a manner that a request originating from host device 215 is accessible by and/or via a MVLAN when the request pertains to a multicast group associated with a particular MVLAN.

As shown in FIG. 5, information associated with the configuration of MVLAN 405-1 (FIG. 4) may be stored (e.g., as shown by ellipse 525). In this example, MVLAN 405-1 may be identified as a MVR source VLAN (e.g., shown as "source") that includes a set of ports (e.g., ports 0 to (H-1)) that correspond to a range of multicast group addresses (e.g., 255.10.0.0 to 255.10.0.Y, where Y≧0) and which is to be set up in the transparent mode (e.g., mode 1), such as a transparent mode (e.g., 1, as shown by ellipse 525). In another example, MVLAN 405-2 (FIG. 4) may be identified as a MVR source VLAN that includes a set of ports (e.g., ports H to (K-1)) that correspond to a range of multicast group addresses (e.g., 255.10.1.0 to 255.10.1.Z, where Z≧0) and which is to be set up in the transparent mode (e.g., mode 1) (e.g., as shown by ellipse 530 of FIG. 5). In yet another example, customer VLAN 410-1 may be identified as a MVR receiver VLAN (e.g., shown as "receiver") that includes a set of MVR receiver ports (e.g., ports K to (J-1)) via which multicast traffic, from one or more MVLANs (e.g., MVLANs 405-1, 405-2, and/or some other MVLAN) may be received (e.g., as shown by ellipse 535 of FIG. 5). Additionally, or alternatively, configuration memory 500 may store information associated with the configurations customer VLANs 410-2 and 410-3 (e.g., as shown by ellipses 540 and 545 of FIG. 5).

Example Processes

Figure 6:
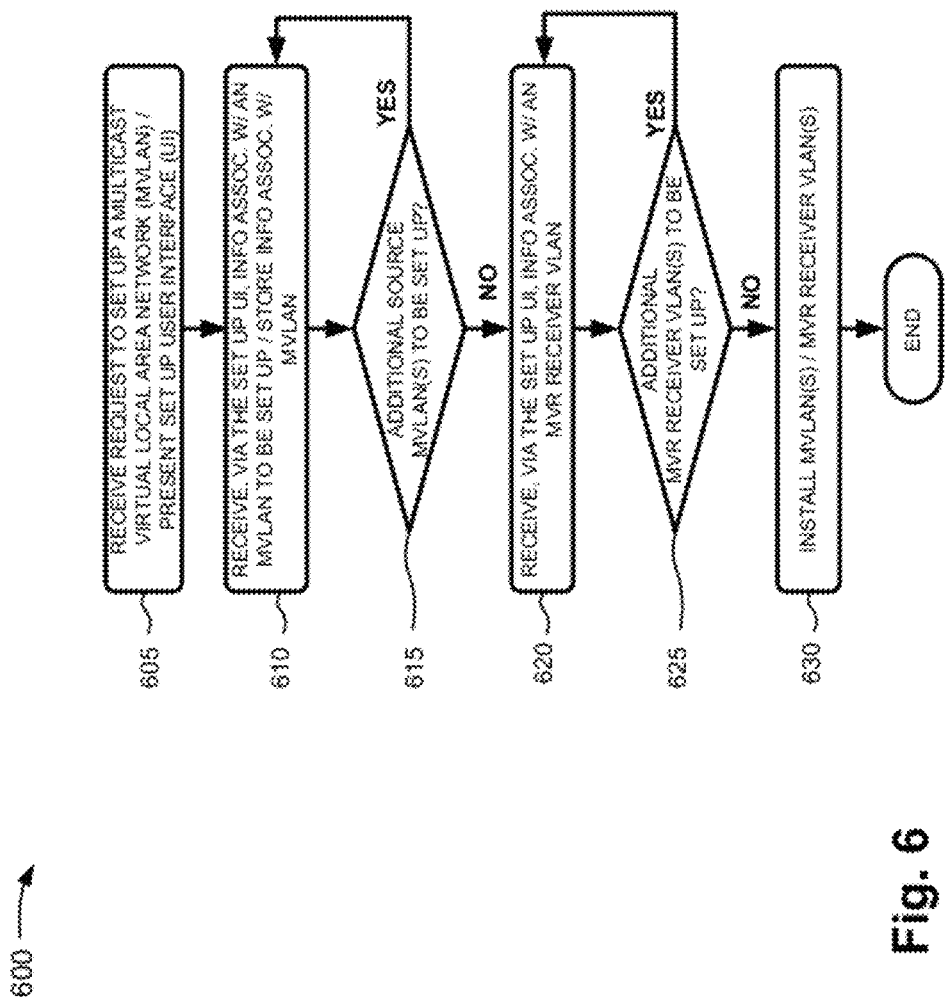
FIG. 6 is a flowchart of an example process for setting up multicast VLAN(s)

FIG. 6 is a flowchart of an example process 600 for setting up and installing multicast VLAN(s) in node 210. In one implementation, process 600 may be performed by node 210. In another implementation, some or all of process 600 may be performed by a device or collection of devices separate from, or in combination with, node 210.

As shown in FIG. 6, process 600 may include receiving a request to set up a MVLAN and presenting a user interface (UI) may for display (block 605). For example, node 210 may receive a request to set up a MVLAN on node 210 and the MVR application may retrieve information associated with the set up UI from a memory associated with node 210. The MVR application may, for example, present the information associated with the set up UI for display on a display device associated with node 210.

As also shown in FIG. 6, process 600 may include receiving, via the set up UI, information associated with the MVLAN to be set up and storing the information associated with the MVLAN (block 610). For example, a network administrator may desire to set up a MVLAN and may enter information associated with the MVLAN into the UI. The information associated with the MVLAN may, in a manner similar to that described above (e.g., with respect configuration memory 500 of FIG. 5), include a VLAN name (e.g., MVLAN 405-1), a VLAN type (e.g. source), a VLAN source (e.g. a range of multicast group addresses from which multicast traffic is to be received), a list of ports, associated with node 210 that correspond to the range of multicast group addresses from which multicast traffic is to be received, and/ or other information. The MVR application may receive, via the set up UI, the information associated with the MVLAN and may store the information associated with the MVLAN in a configuration memory (e.g., configuration memory 500 of FIG. 5).

As further shown in FIG. 6, if additional MVLANs are to be set up (block 615—YES), then process 600 may include receiving, via the set up UI, information associated with another MVLAN (block 605). For example, the network administrator may desire to set up additional MVLANs and may select a particular button on the set up UI (e.g., using a pointing device associated with node 210, a keyboard/keypad associated with node 210, etc.), which may permit the network administrator to enter, into the set up UI, information associated with another MVLAN.

As yet further shown in FIG. 6, if additional MVLANs are not to be set up (block 615—NO), then process 600 may include receiving, via the set up UI, information associated with a MVR receiver VLAN (block 620). For example, the network administrator may select a particular button on the set up UI that permits the network administrator to set up a MVR receiver VLAN. The network administrator may, for example, enter information associated with a customer VLAN (e.g., a MVR receive VLAN) into the set up UI. The information associated with the MVR receiver VLAN may, in a manner similar to that described above (e.g., with respect configuration memory 500 of FIG. 5), include a VLAN name (e.g., customer VLAN 410-1), a VLAN type (e.g. receiver), a VLAN source (e.g. a list of MVLANs from which multicast traffic is to be received), a list of ports (e.g., MVR receiver ports), associated with node 210, via which the multicast traffic is to be received and/or transmitted to host devices 215. The MVR application may receive, via the set up UI, the information associated with the MVR receiver VLAN and may store the information associated with the MVR receiver VLAN in a configuration memory (e.g., configuration memory 500 of FIG. 5).

As still further shown in FIG. 6, if additional MVR receiver VLANs are to be set up (block 625—YES), then process 600 may include receiving, via the set up UI, information associated with another MVR receiver VLAN (block 620). For example, the network administrator may desire to set up additional MVR receiver VLANs and may select a particular button on the set up UI (e.g., using a pointing device associated with node 210, a keyboard/keypad associated with node 210, etc.), which may permit the network administrator to enter, into the set up UI, information associated with another MVR receiver VLAN.

As yet further shown in FIG. 6, if additional MVR receiver VLANs are not to be set up (block 625—NO), then process 600 may include installing MVLAN(s) and MVR receiver VLAN(s) (block 630). For example, the network administrator may desire to deploy the MVLAN(s) and/or MVR receiver VLAN(s) on node 210 and may request that the MVLAN(s) and/or MVR receiver VLAN(s) be deployed by selecting a particular button on the set up UI. The MVR application may receive the request and may generate multicast forwarding entries that link a MVLAN to corresponding MVR receiver VLANs, which designated the MVLAN as a source from which multicast traffic is to be received. The MVR application may, for example, create logical links between the MVLAN and the MVR receiver ports, associated on the MVR receiver VLANs, via which the multicast traffic will be received and/or transmitted to host devices 215. The MVR application may, for example, store the multicast forwarding entries in a multicast forwarding table (e.g., a multicast forwarding table 700 of FIGS. 7A and 7B, described below) associated with node 210. Additionally, or alternatively, the MVR application may send information associated with multicast forwarding entries, as MVLAN forwarding tables (e.g., sometimes referred to as "MVLAN bridging tables"), to each port associated with the MVLAN and/or MVR receiver VLAN.

Figure 7:
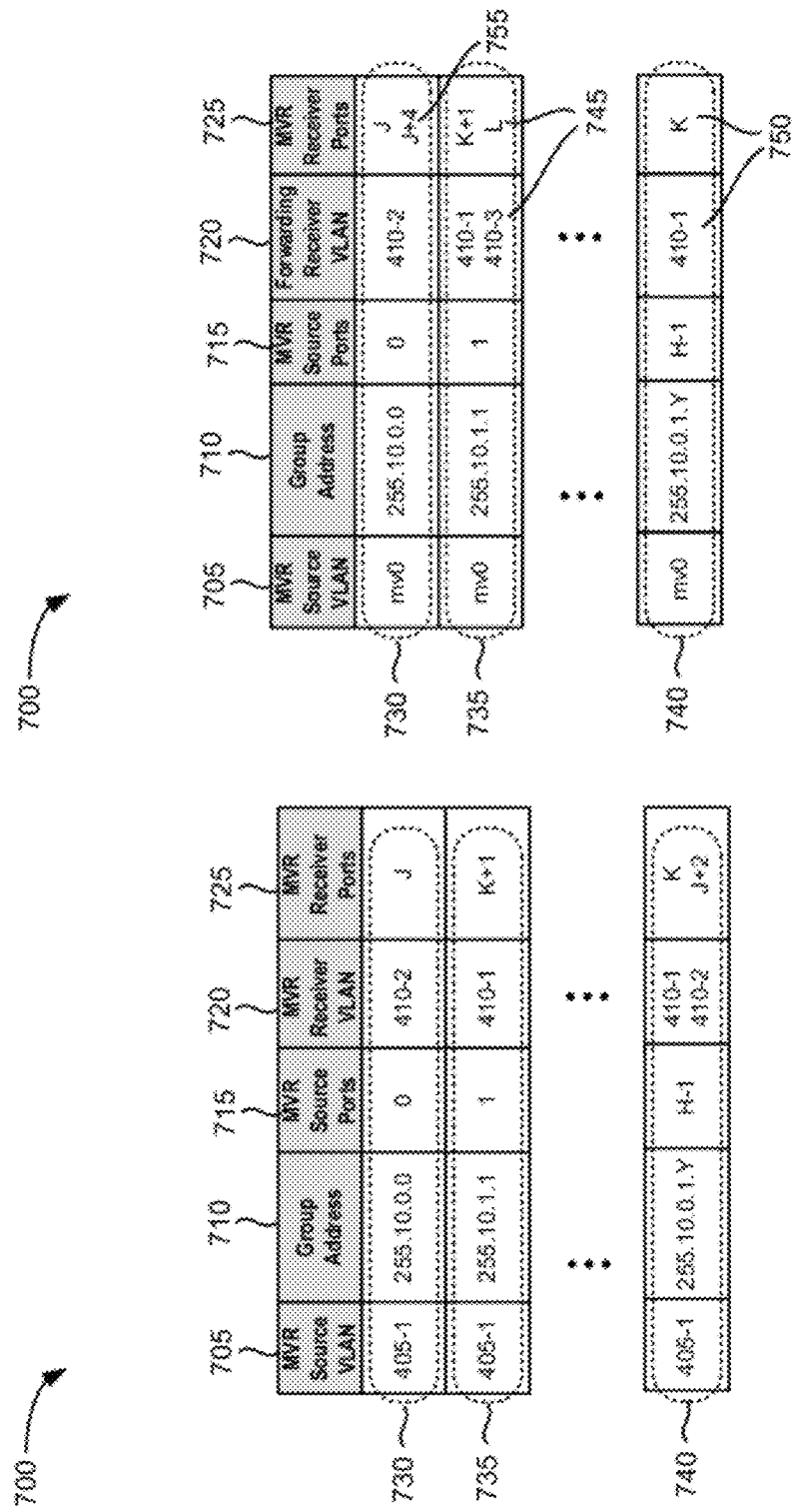
FIGS. 7A and 7B are example multicast forwarding tables associated with a multicast VLAN.

FIGS. 7A and 7B are examples of multicast forwarding table 700 associated with a MVLAN. As illustrated in FIGS. 7A and 7B, multicast forwarding table 700 may include a collection of fields, such as a MVR Source VLAN field 705, a group address field 710, a MVR source ports field 715, a MVR receiver VLAN field 720, and a MVR receiver ports field 725. Multicast forwarding table 700 includes fields 705-725 for explanatory purposes. In practice, multicast forwarding table 700 may include additional fields, fewer fields, different fields, and/or differently arranged fields than are described with respect to multicast forwarding table 700.

MVR Source VLAN field 705 may store a name and/or an identifier associated with a particular MVLAN (e.g., MVR source VLAN). Group address field 710 may store a multicast group address (e.g., an IP address, etc.) for each port associated with the particular MVLAN. MVR source ports field 715 may store a port identifier (e.g., a port associated with I/O unit 315, of FIG. 3) for each port associated with the particular MVLAN. MVR receiver VLAN field 720 may store a name and/or an identifier associated with one or more MVR receiver VLANs (e.g., a customer VLAN) to which multicast traffic may be sent (e.g., based o the MVLAN set up operation described above with respect to FIG. 6). MVR receiver ports field 725 may include a port identifier (e.g., a port associated with I/O unit 315) for each MVR receiver port that has subscribed to a group membership (e.g., associated with a multicast group address).

As shown in FIG. 7A, multicast forwarding table 700 may store group membership information and multicast forwarding entries for a particular MVLAN at a particular point in time. For example, the MVR application may store a multicast forwarding entry (e.g., as shown by ellipse 730), associated with MVLAN 405-1, for a particular multicast group (e.g., with an address of 255.10.0.0) corresponding to a particular port (e.g., port 0). Additionally, or alternatively, the MVR application may store information associated with the MVR receiver VLAN to which the multicast traffic (e.g., associated with the particular multicast group) is to be forwarded. For example, the MVR application may store an identifier associated with the MVR receiver VLAN(s) (e.g., 410-2) and/or a port (e.g., port J) associated with the MVR receiver VLAN to which the multicast traffic is to be forwarded (e.g., as shown by ellipse 730). In another example, the MVR application may store other multicast forwarding entries (e.g., as shown by ellipses 735 and 740 of FIG. 7A), associated with other multicast groups associated MVLAN 405-1 and/or associated with other MVLANs 405 (e.g., not shown in FIG. 7A.)

The MVR application may perform MVR receiver port monitoring operations and may store updated multicast forwarding entries in multicast forwarding table 700. For example, the MVR application may monitor MVR receiver ports associated with MVR receiver VLANs 410-1 through 410-3 that have been deployed to node 210 (e.g., at a prior point in time) to identify IGMP traffic from host devices 215 associated with the MVR receiver ports. The MVR application may, for example, use IGMP snooping to detect requests to subscribe to (e.g., a join) and/or unsubscribe from (e.g., a leave) multicast group memberships associated with multicast traffic. In one example, as shown in FIG. 7B, the MVR application may identify a request (e.g., from a particular host device 215) on port L of MVR receiver VLAN 410-3 to join a particular multicast group membership (e.g., associated with a group address 255.10.1.1) and the MVR application may add the MVR receiver VLAN (e.g., 410-3) to the particular multicast group membership (e.g., shown as indication 745 of FIG. 7B). Additionally, or alternatively, the MVR application may store the MVR receiver port (e.g., port L) in multicast forwarding entry 735 to which the multicast traffic, associated with the particular multicast group membership, is to be sent and/or via which the multicast traffic is to be received by the particular host device 210.

In another example, as shown in FIG. 7B, the MVR application may identify a request (e.g., from another host device 215) on port J+2 of MVR receiver VLAN 410-2 to leave a particular multicast group membership (e.g., associated with a group address 255.10.1.Y) and the MVR application may remove the MVR receiver VLAN (e.g., 410-2) from the particular multicast group membership (e.g., shown as indication 750). Additionally, or alternatively, the MVR application may remove the MVR receiver port (e.g., port J+2) from multicast forwarding entry 740 which may cause the multicast traffic to no longer be sent to port J+2 or the other host.

In yet another example, the MVR application may send a series of queries (e.g., IGMP queries) to MVR receiver VLANs 410-1 through 410-3 and/or other VLANs to determine and/or update group membership for ports on a MVLAN. The multicast queries associated with a particular group membership may include a multicast group address corresponding to the group membership. For example, the MVR application may receive a report from a MVR receiver VLAN (e.g., identified as 410-2) that may indicate that another port (e.g., J+4) has subscribed to the particular multicast group. The MVR application may update the group membership and/or multicast forwarding entry (e.g., multicast forwarding entry 755 of FIG. 7B) in a manner similar to that described above.

Figure 8:
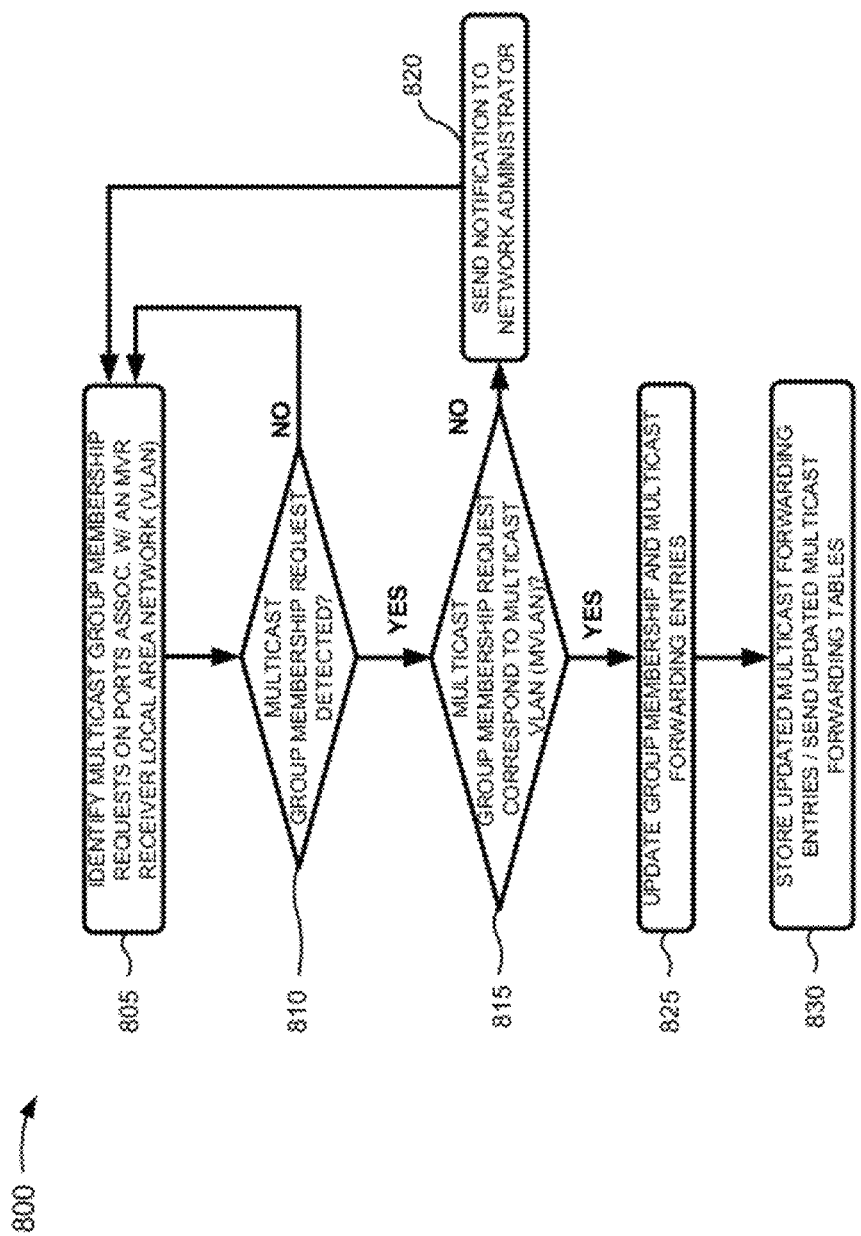
FIG. 8 is a flowchart of an example process for setting up or updating multicast forwarding entries in a multicast forwarding table.

FIG. 8 is a flowchart of an example process 800 for setting up or updating multicast forwarding entries in a multicast forwarding table. In one implementation, process 800 may be performed by node 210. In another implementation, some or all of process 800 may be performed by a device or collection of devices separate from, or in combination with, node 210.

As shown in FIG. 8, process 800 may include identifying multicast group membership requests on ports associated with a MVR receiver VLAN (block 805). For example, the MVR application may monitor ports (e.g., MVR receiver ports) associated with a customer VLAN (e.g., set up as MVR receiver VLAN 410, as described above with respect to FIG. 6) to determine whether multicast group membership requests (e.g., sent by host device 210) are present on the ports associated with MVR receiver VLAN 410.

In one example, MVLAN 405 may be configured in the transparent mode (e.g., mode 1 of FIG. 5)) in which the MVR application may cause the multicast group membership reports to be sent (e.g., flooded) to all or a portion of the other ports associated with the VLAN (e.g., ports associated with MVLAN 405, MVR receiver VLAN 410, and/or other VLANs). In this case, there may be complete transparency between MVLAN 405 and the multicast group membership requests associated with a user of host device 215 (e.g., such as viewing habits, when the user may change a channel, etc.). The MVR application may use IGMP snooping (e.g., on ports associated with MVR receiver VLANs 410) to detect multicast group membership requests (e.g., IGMP traffic) that pertain to multicast group memberships associated with MVLAN 405.

In another example, MVLAN 405 may be configured in proxy mode (e.g., mode 2 of FIG. 5) in which the MVR application may cause a only multicast group membership reports to be sent, to MVLAN 405, that correspond to a multicast group membership that is maintained by MVLAN 405. In this case, MVLAN 405 may only receive IGMP traffic from host device 215 that are associated with MVLAN 405. The MVR application may use IGMP snooping (e.g., on ports associated with MVR receiver VLANs 410) to identify multicast group membership requests that are to be sent to MVLAN 405.

In either of the above examples, multicast group membership requests that pertain MVLAN 405 may be identified by monitoring MVR receiver ports (e.g., using IGMP snooping). For example, in a manner similar to that described above (e.g., with respect to FIGS. 7A and 7B), the MVR application may use IGMP snooping to detect IGMP traffic that includes the multicast group membership requests (e.g., joins, leaves, etc.) sent by host device 210 associated with a particular port. In another example, the MVR application may, in a manner similar to that described above (e.g., with respect to FIGS. 7A and 7B), send an IGMP query to MVR receiver VLANs 410 to determine which multicast group memberships are associated with MVLAN 405. In this example, the MVR application may use IGMP snooping to identify multicast group membership reports (e.g., that indicate group membership in one or more multicast groups), which the MVR application may use to update group membership on MVLAN 405 and/or to update multicast forwarding entries in a forwarding table (e.g., multicast forwarding table 700 of FIGS. 7A and 7B) associated with node 210.

In one example, MVLAN 405 may be configured in the transparent mode and the MVR application may send (e.g., flood) multicast group membership reports, received from host device 215 via a port associated with MVR receiver VLAN, to other ports on the VLAN (e.g., ports associated with MVLAN 405, MVR receiver VLAN 410, and/or other VLANs).

As also shown in FIG. 8, if a multicast group membership request is not detected (block 810—NO), the process 800 may include identifying multicast group membership requests on ports associated with a MVR receiver VLAN (block 805). For example, if the MVR application does not detect a multicast group membership request and/or does not receive a report in response to an IGMP query, then the MVR application may continue to monitor the MVR receiver ports associated with MVR receiver VLAN 410.

As further shown in FIG. 8, if a multicast group membership request is detected (block 810—YES) and if a multicast group membership request does not correspond to a MVLAN (block 815—NO), then process 800 may include sending a notification to a network administrator (block 820). For example, if the MVR application identifies a multicast group membership request (e.g., a join and/or leave) and/or a report indicating membership in a multicast group membership on a port (e.g., port L) associated with MVR receiver VLAN 410-3, then the MVR application may determine whether the identified multicast group membership request (e.g., that includes a multicast group address) corresponds to the range of group addresses associated with MVLAN 405.

For example, if the MVR application determines that the membership request does not correspond to a range of multicast group addresses associated with MVLAN 405, then the MVR application may send a notification to a network administrator indicating that the MVLAN is not configured to forward multicast traffic associated with a multicast group membership request. In another example, the MVR application may send a notification to host device 215 associated with the port from which the multicast group membership was identified and/or received indicating that the address cannot be processed. In yet another example, the MVR application may drop and/or ignore the request.

As still further shown in FIG. 8, if a multicast group membership request is detected (block 810—YES) and if a multicast group membership request corresponds to a MVLAN (block 815—YES), then process 800 may include updating group membership and multicast forwarding entries (block 825). For example, the MVR application may identify a multicast group membership request and/or a report indicating membership in a multicast group membership on a port (e.g., port L) associated with MVR receiver VLAN 410-3. Additionally, or alternatively, the MVR application may determine that the identified multicast group membership request (e.g., that includes a multicast group address) corresponds to the range of group addresses associated with MVLAN 405.

For example, the MVR application may determine that the multicast group membership request is a request to join a multicast group that includes a multicast group address (e.g., of 255.10.1.1). Additionally, or alternatively the MVR application may, for example, determine that the multicast group membership request corresponds to a range of multicast group addresses (e.g., matches a particular multicast group address within the range of multicast group addresses) associated with MVLAN 405. Based on the determination and in a manner similar to that described above (e.g., with respect to FIG. 7B), the MVR application may, for example, add MVR receiver VLAN 410-3 to the multicast group membership (e.g., that corresponds to port 0 on MVLAN 405). Additionally, or alternatively, the MVR application may update a multicast forwarding entry within a multicast forwarding table (e.g., multicast forwarding table 700 of FIGS. 7A and 7B) by adding the MVR receiver VLAN 410-3 identifier and/or the port identifier (e.g., port L) to the multicast forwarding entry associated with the multicast group membership corresponding to port 0 on MVLAN 405-1. The MVR application may store the updated multicast forwarding entry in a memory associated with node 210.

In another example, the MVR application may determine that the multicast group membership request is a leave request associated with a multicast group (e.g., with multicast group address of 255.10.0.0) and, in a manner similar to that described above with respect to FIG. 7B), the MVR application may remove the MVR receiver VLAN 410-2 identifier and/or the port identifier (e.g., port J+2) from the forwarding entry of a forwarding table associated with MVLAN 405.

As shown in FIG. 8, process 800 may include storing updated multicast forwarding entries and sending updated multicast forwarding tables (block 830). For example, the MVR application may save the updated multicast forwarding entries in a multicast forwarding table (e.g., multicast forwarding table 700 of FIGS. 7A and 7B) associated with node 210. In addition, the MVR application may send information associated with updated multicast forwarding entries, as updated MVLAN forwarding tables (e.g., sometimes referred to as "MVLAN bridging tables"), to each port associated with the MVLAN and/or MVR receiver VLAN. When the MVR application stores the updated multicast forwarding entries or sends the updated multicast forwarding tables, process 800 may end or the MVR application may identify another multicast group member ship request in a manner similar to that described above (e.g., with respect to block 805).

Figure 9:
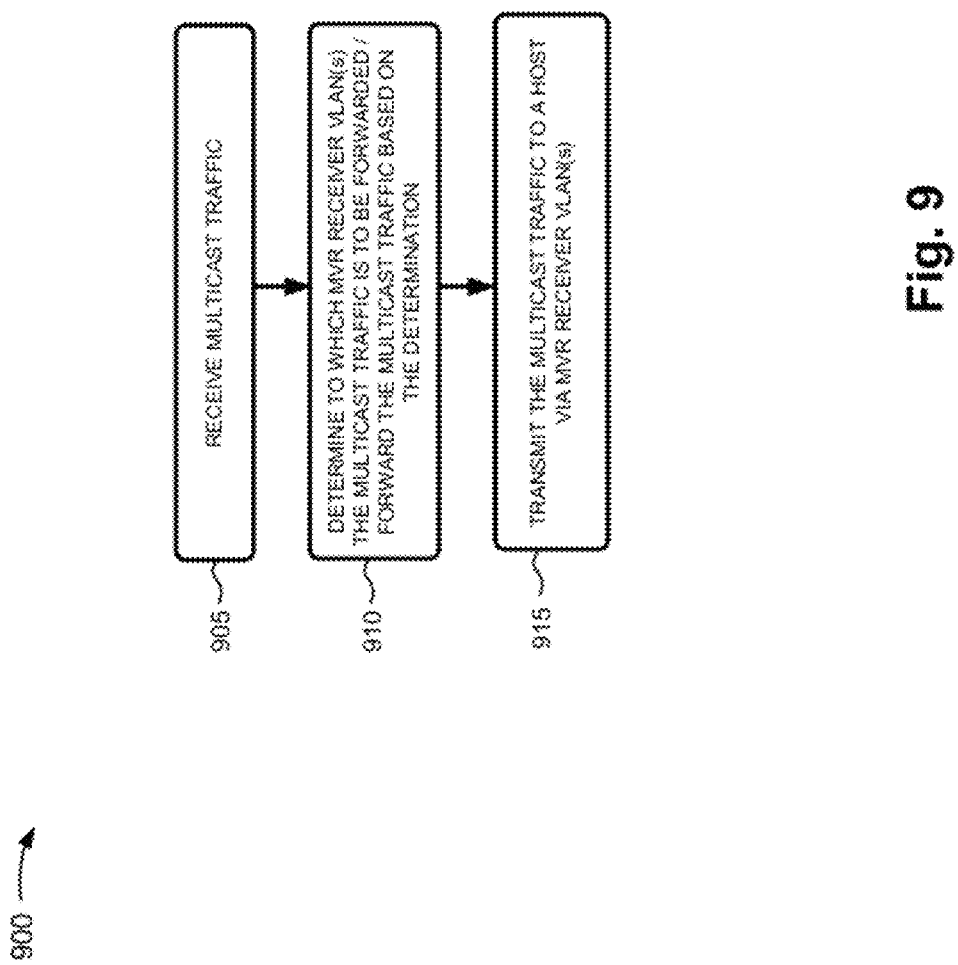
FIG. 9 is a flowchart of an example process 900 for using a multicast VLAN to process multicast traffic.

FIG. 9 is a flowchart of an example process 900 for using an MVLAN to process multicast traffic. In one implementation, process 900 may be performed by node 210. In another implementation, some or all of process 900 may be performed by a device or collection of devices separate from, or in combination with, node 210.

As shown in FIG. 9, process 900 may include receiving multicast traffic (block 905). Assume that a MVLAN (e.g., MVLAN 405) has been set up on node 210 (e.g., via MVLAN set up process 600 of FIG. 6). Assume further that a customer VLAN or set of customer VLANs were configured as MVR receiver VLANs (e.g., MVR receiver VLANs 410) to receive multicast traffic via MVLAN 405. For example, MVLAN 405 may receive multicast traffic on a particular port that corresponds to a particular multicast group address. The multicast group address may, for example, be associated with a particular multicast group membership.

As also shown in FIG. 9, process 900 may include determining to which MVR receiver VLANs 410 the multicast traffic is to be forwarded and the multicast traffic may be forwarded based on the determination (block 910). For example, the MVR application may retrieve a multicast forwarding table (e.g., multicast forwarding table 700 of FIGS. 7A and 7B) from a memory associated with node 210. The MVR application may use the multicast forwarding table to look up MVR receiver VLAN 410, or a set of MVR receiver VLANs 410, that correspond to the particular multicast group address and/or MVLAN 405 port to which the multicast traffic was sent. For example, the MVR application may determine (e.g., from the multicast forwarding table) that MVR receiver VLAN 410 is included in the multicast group membership. Additionally, or alternatively, the MVR application may determine that a particular port, associated with MVR receiver VLAN 410, is included in a multicast forwarding entry that is included in the multicast forwarding table. Based on the determination, the MVR application may cause the multicast traffic to be sent to the particular port associated with the MVR receiver VLAN 410.

As further shown in FIG. 9, process 900 may include transmitting the multicast traffic to a host via MVR receiver VLAN 410 (block 915). For example, MVR receiver VLAN 410 may receive the multicast traffic via the particular port and may transmit the multicast traffic to host device 210 that subscribed to the particular multicast group membership at a prior point in time.

Conclusion

An implementation described herein may include systems and/or methods that provide for a multicast VLAN-based multicast VLAN registration using a technique that enables a MVLAN to send multicast traffic to a host device via a VLAN that is not a part of the MVLAN. In one example implementation, a MVLAN may be set up on a network node that may enable the network node to perform VLAN-based multicast operations. The MVR application may, for example, receive parameters, from a network administrator, to set up a MVLAN and/or a MVR receiver VLAN and may use the parameters to install and/or deploy the MVLAN and/or the MVR receiver VLAN on the network node.

In another example implementation, the MVR application may establish and/or update multicast forwarding entries associated with a MVLAN. For example, the MVR application may monitor multicast traffic on a port associated with a MVR receiver VLAN and may identify a request to join a multicast group membership that was sent from a host device. Based on the request, the MVR application may, for example, cause a forwarding entry to be added to a multicast forwarding table that enables particular multicast traffic to be sent to the host device.

In yet another example implementation, the MVR application may perform multicast operations on received multicast traffic. For example, a MVLAN may receive multicast traffic via a particular port and the MVR application may determine to which MVR receiver VLAN the multicast traffic is to be sent. The MVR application may, for example, use multicast forwarding table to determine to which MVR receiver VLAN the multicast traffic to be sent.

The foregoing description provides illustration and description, but is not intended to be exhaustive or to limit the invention to the precise form disclosed. Modifications and variations are possible in light of the above teachings or may be acquired from practice of the invention.

While series of blocks have been described with regard to FIGS. 6, 8, and 9, the order of the blocks may be modified in other embodiments. Further, non-dependent blocks may be performed in parallel.

It will be apparent that aspects, as described herein, may be implemented in many different forms of software, firmware, and hardware in the aspects illustrated in the figures. The actual software code or specialized control hardware used to implement aspects described herein is not limiting of the invention. Thus, the operation and behavior of the embodiments were described without reference to the specific software code—it being understood that software and control hardware may be designed to implement the aspects based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A network node that includes a plurality of ports via which multicast traffic is received or transmitted, the network node comprising:
    a memory to store information associated with a multicast forwarding table the information including:
        identifiers for one or more ports, of the plurality of ports, associated with a multicast virtual local area network (MVLAN) via which the multicast traffic is received by the network node, and
        identifiers for two or more receiver virtual local area networks (RVLANs) associated with two or more other ports, of the plurality of ports, via which the multicast traffic is to be received from the MVLAN, an identifier for at least one of the two or more RVLANs corresponding to an identifier for at least one of the one or more ports; and
    a processor to:
        receive the multicast traffic via a particular port of the one or more ports;
        perform, using the multicast forwarding table, a look up operation, based on an identifier for the particular port, to determine whether to send the multicast traffic via a first RVLAN of the two or more RVLANs, via a second RVLAN of the two or more RVLANs, or via the first RVLAN and the second RVLAN,
        transmit the multicast traffic, to a host device and via the first RVLAN, when the look up operation indicates that a first identifier, associated with the first RVLAN, corresponds to the identifier for the particular port,
        transmit the multicast traffic, to another host device and via the second RVLAN, when the look up operation indicates that a second identifier, associated with the second RVLAN, corresponds to the identifier for the particular port,
        transmit the multicast traffic, to the host device via the first RVLAN and to the other host device via the second RVLAN, when the look up operation indicates that the first identifier and the second identifier correspond to the identifier for the particular port,
        send, to a plurality of host devices and via the two or more other ports, a query to determine group membership associated with the multicast traffic, the group membership indicating whether the multicast traffic is to be received,
        receive, from at least one host device, of the plurality of host devices and via one of the two or more ports, a report based on the query,
        send the report to the plurality of ports when the MVLAN is configured in a transparent mode that permits the MVLAN to access other reports not associated with the MVLAN, and
        send the report to the particular port when the MVLAN is configured in a proxy mode that prevents the MVLAN from accessing other reports not associated with the MVLAN.

2. The network node of claim 1, where, when transmitting the multicast traffic to the host device and via the first RVLAN, the processor is further to:
    obtain, from the multicast forwarding table, an identifier associated with a port, of the two more ports, that corresponds to the first identifier, and
    send the multicast traffic to the port based on the obtained identifier.

3. The network node of claim 1, where, when performing the look up operation, the processor is further to:
    determine whether the identifier for the particular port matches at least one of the identifiers for the one or more ports stored in the multicast forwarding table, and
    obtain at least one of the first identifier and the second identifier that corresponds to the identifier for the particular port when the identifier for the particular port matches the at least one of the identifiers for the one or more ports.

4. The network node of claim 1, where the processor is further to:
    monitor each of the two or more other ports to determine whether a request, associated with the multicast traffic, has been received,
    detect, via a particular port of the two or more other ports, a request to join a multicast group, that permits the multicast traffic to be received, based on the monitoring, and
    update the multicast forwarding tables by storing the first identifier, associated with the first RVLAN, in the multicast forwarding tables in manner that the first identifier corresponds to the identifier for the particular port.

5. The network node of claim 1, where the processor is further to:
    monitor each of the two or more other ports to determine whether a request, associated with the multicast traffic, has been received,
    detect, via a particular port of the two or more other ports, a request to leave a multicast group, that causes the multicast traffic to not be received, based on the monitoring, and
    update the multicast forwarding tables by deleting the second identifier, associated with the second RVLAN and that corresponds to the identifier for the particular port, from the multicast forwarding table.

6. The network node of claim 1, where the one or more ports are different than the than the two or more other ports.

7. The network node of claim 1, where the processor is further to:
    receive first information associated with the MVLAN, the first information including a range of group addresses associated with other multicast traffic, the other multicast traffic corresponding to the one or more ports, receive second information associated with the two or more RVLANs, the second information including respective identifiers associated with the MVLAN for the two or more RVLANs, and deploy, on the network node, the MVLAN and the two or more RVLANs based on the first information associated with the MVLAN and the second information associated with the two or more RVLANs.

8. The network node of claim 7 where, when deploying the MVLAN and the two or more RVLANs, the processor is further to:

establish a logical link between the MVLAN and the two or more RVLANs, the other multicast traffic being sent from the MVLAN to the two or more RVLANs, via the logical link, based on the respective identifiers associated with the MVLAN for the two or more RVLANs, and create the multicast forwarding table based on the logical link.

9. The network node of claim 1, where the host device and the other host device are not connected to the MVLAN.

10. The network node of claim 1, where the multicast traffic includes Internet protocol television (IPTV) streaming video data associated with a particular channel.

11. A method, comprising:

receiving, by a network node, information associated with a multicast virtual local area network (MVLAN) and information associated with a receiver virtual local area network (RVLAN), the network node including a plurality of ports;

deploying, on the network node, the MVLAN and the RVLAN based on the information associated with MVLAN and the information associated with the RVLAN, the MVLAN including one or more ports, of the plurality of ports, via which multicast traffic is received from another network node, the one or more ports corresponding to a range of multicast group addresses, and the RVLAN including one or more other ports, of the plurality of ports, that are connected to one or more host devices and logically establishing the MVLAN as a source from which the RVLAN is to receive the multicast traffic;

detecting, by the network node and via a particular port of the one or more other ports, a request, to join a multicast group, from a host device of the one or more host devices, detecting the request to join a multicast group including:

monitoring each of the one or more other ports to determine that the request to join the multicast group is received;

sending the request to join the multicast group to the plurality of ports when the MVLAN is configured in a transparent mode, the transparent mode permitting a request, received from one of the one or more host devices at one of the other one or more ports, to be accessed by the MVLAN when the request is associated with a multicast group that does not correspond to the MVLAN, and sending the request to the one or more ports when the MVLAN is configured in a proxy mode, the proxy mode permitting the request, received from the one of the one or more host devices at the one of the other one or more ports, to be accessed by the MVLAN when the request is associated with a multicast group that corresponds to the MVLAN;

creating, by the network node and based on the request, a forwarding entry in a multicast forwarding table associated with the network node, the forwarding entry including an identifier for the particular port to which particular multicast traffic, associated with the multicast group, is to be sent and an identifier for one of the one or more ports associated with the multicast group;

receiving, by the network node and via the one of the one or more ports, the particular multicast traffic; and transmitting, to the host device and via the particular port, the particular multicast traffic based on the forwarding entry.

12. The method of claim 11, where the one or more ports are different than the other one or more other ports.

13. The method of claim 11 where deploying the MVLAN and the RVLAN includes:

creating the multicast forwarding table, the multicast forwarding table including a plurality of forwarding entries that correspond to a plurality of multicast groups, where each of the forwarding entries includes:

a different one, of the one or more ports, that corresponds to a respective different one of the range of multicast group addresses, each one of the range of multicast group addresses corresponding to a respective different one of the plurality of multicast groups; and at least one port, of the one or more other ports, that correspond to the respective different one of the range of multicast addresses.

14. The method of claim 11, where the one or more host devices are not connected to the MVLAN.

15. The method of claim 11, where deploying the MVLAN and the RVLAN includes:

establishing a logical link between the MVLAN and the RVLAN, the logical link enabling the multicast traffic, received on the one or more ports, to be sent to the RVLAN via at least one of the other one or more other ports.

16. A method comprising:

receiving, by a network node, information associated with a multicast virtual local area network (MVLAN) and information associated with a receiver virtual local area network (RVLAN), the network node including a plurality of ports;

deploying, on the network node, the MVLAN and the RVLAN based on the information associated with MVLAN and the information associated with the RVLAN, the MVLAN including one or more ports, of the plurality of ports, via which multicast traffic is received from another network node, the one or more ports corresponding to a range of multicast group addresses, the RVLAN including one or more other ports, of the plurality of ports, that are connected to one or more host devices and logically establishing the MVLAN as a source from which the RVLAN is to receive the multicast traffic, and deploying the MVLAN and the RVLAN including:

establishing the MVLAN in either a transparent mode or a proxy mode, a service provider associated with the network node accessing, via the MVLAN in the transparent node, requests to join or to leave a plurality of multicast groups that are received from the host device; and the service provider accessing, via the network node serving as a proxy between the service provider and the host device when the MVLAN is in the proxy mode, the requests, received by from the host device, to join or to leave the plurality of multicast groups associated with the MVLAN;

detecting, by the network node and via a particular port of the one or more other ports, a request, to join a multicast group, from a host device of the one or more host devices;

creating, by the network node and based on the request, a forwarding entry in a multicast forwarding table associated with the network node, the forwarding entry including an identifier for the particular port to which particular multicast traffic, associated with the multicast group, is to be sent and an identifier for one of the one or more ports associated with the multicast group;

receiving, by the network node and via the one of the one or more ports, the particular multicast traffic; and transmitting, to the host device and via the particular port, the particular multicast traffic based on the forwarding entry.

17. The method of claim 11, where monitoring each of the one or more other ports includes:

monitoring the one or more other ports using an Internet Group Management Protocol (IGMP) snooping technique.

18. A network node, comprising:

a memory to store a multicast forwarding table that contains a plurality of forwarding entries that govern how multicast traffic is to be forwarded from a multicast virtual local area network (VLAN) associated with the network node, to a plurality of receiver VLANs associated with the network node, each forwarding entry including:

information associated with a multicast group, of one or more multicast groups, that is associated with one or one or more ports on the multicast VLAN via which the multicast traffic is received, and information associated with a one or more receiver VLANs, of the plurality of receiver VLANS, to which the received multicast traffic is to be sent; and a processor to:

receive information associated with the multicast VLAN, the information associated with the multicast VLAN including:

a plurality of group addresses, associated with the multicast traffic, that correspond to the one or more ports, and an indicator that the multicast VLAN is to be deployed in transparent mode or in proxy mode, the transparent mode enabling requests, received from a user device and related to joining or leaving any of a plurality of multicast groups, to be accessed via the multicast VLAN, and the proxy mode enabling requests, received from the user device and related to joining or leaving one or more of the plurality of multicast groups that are associated with the multicast VLAN, to be accessed via the multicast VLAN, receive information associated with the plurality of reciever VLANs, the received information associated with the plurality of reciever VLANs including identifiers associated with the multicast VLAN from which the multicast traffic is to be received, deploy, on the network node, the multicast VLAN and the plurality of receiver VLANs based on the information associated with the multicast VLAN and the information associated with the plurality of receiver VLANs, receive multicast traffic associated with a particular multicast group of the one or more multicast groups, via a particular port, of the one or more ports, on the multicast VLAN, perform, using the multicast forwarding table, a look up operation, based on the particular multicast group, to determine to which of the plurality of receiver VLANs the multicast traffic is to be sent, and transmit the multicast traffic, associated with the particular multicast group, to one or more user devices, via one or more receiver VLANs, based on a determination that the forwarding entry, of the plurality of forwarding entries associated with the particular multicast group, includes information associated with the one or more receiver VLANs.

19. The network node of claim 18, where, when performing the look up operation to determine to which of the plurality of receiver VLANs the multicast traffic is to be sent, the processor is further to:

determine whether the particular multicast group matches a multicast group, of the plurality of multicast groups stored in the multicast forwarding table, and obtain, from the multicast forwarding table, the forwarding entry, of the plurality of forwarding entries associated with the particular multicast group.

20. The network node of claim 18, where the processor is further to:

monitor each of a plurality of ports associated with the plurality of receiver VLANs to determine whether a request, associated with a multicast group, has been received by at least one of the one or more user devices, detect, via a particular port, of the plurality of ports, associated with a particular receiver VLAN of the plurality of receiver VLANs, that a request to join or a request to leave the multicast group has been received based on the monitoring, update the multicast forwarding tables by adding information associated with the particular receiver VLAN to a forwarding entry associated with the multicast group when the request to join is detected, and update the multicast forwarding tables by removing the information associated with the particular receiver VLAN from the forwarding entry associated with the multicast group when the request to leave is detected.

21. The network node of claim 18 where, when deploying the multicast VLAN and the plurality of receiver VLANs, the processor is further to:

establish a plurality of logical links between the multicast VLAN and the plurality of receiver VLANs that permit the multicast traffic to be sent from the MVLAN to the plurality of VLANs, and create the multicast forwarding table based on the plurality of logical links between the multicast VLAN and the plurality of receiver VLANs.

22. The method of claim 16, where the one or more ports are different than the other one or more other ports.

23. The method of claim 16 where deploying the MVLAN and the RVLAN includes:

creating the multicast forwarding table that includes a plurality of forwarding entries that correspond to a plurality of multicast groups, where each of the plurality of forwarding entries includes:

a different one of the one or more ports that corresponds to a respective different one of the range of multicast group addresses, each one of the range of multicast group addresses corresponding to a respective different one of the plurality of multicast groups; and at least one port of the one or more other ports that correspond to the respective different one of the range of multicast addresses.

24. The method of claim 16, where the one or more host devices are not connected to the MVLAN.

25. The method of claim 16, where deploying the MVLAN and the RVLAN further includes:
establishing a logical link between the MVLAN and the RVLAN, the logical link enabling the multicast traffic, received on the one or more ports, to be sent to the RVLAN via at least one of the other one or more other ports.

* * * * *